United States Patent Office 3,282,195
Patented Nov. 1, 1966

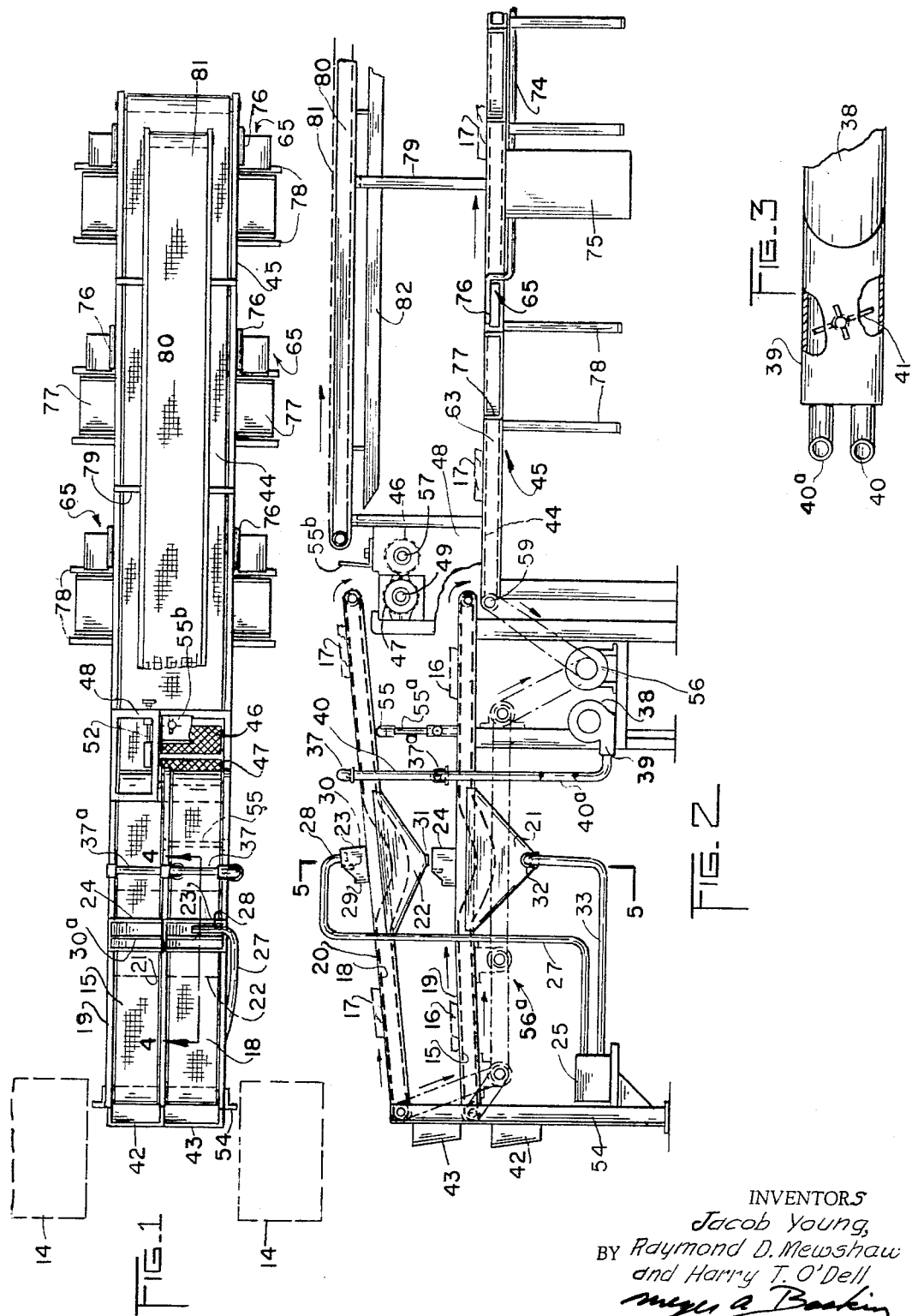

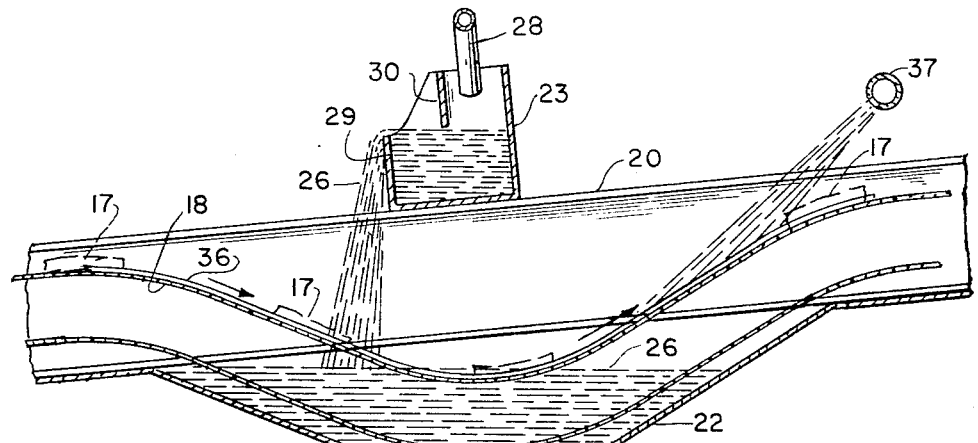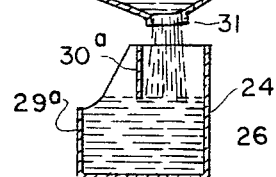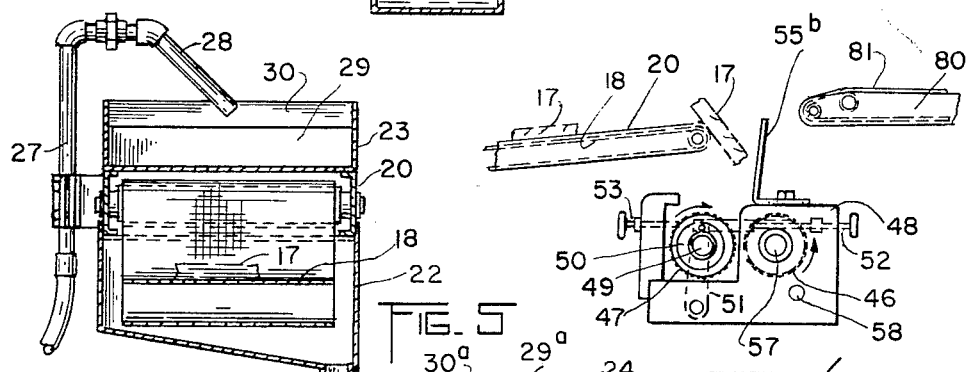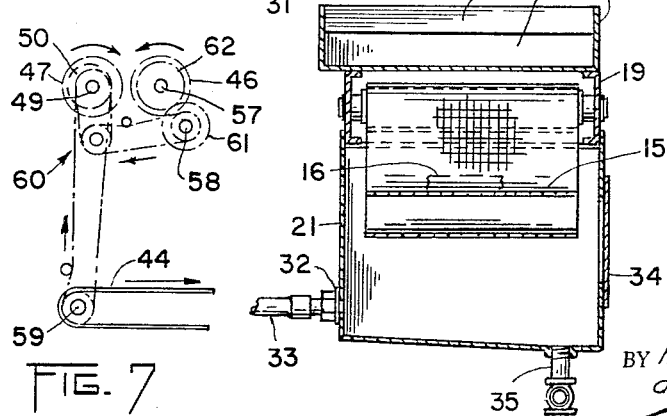

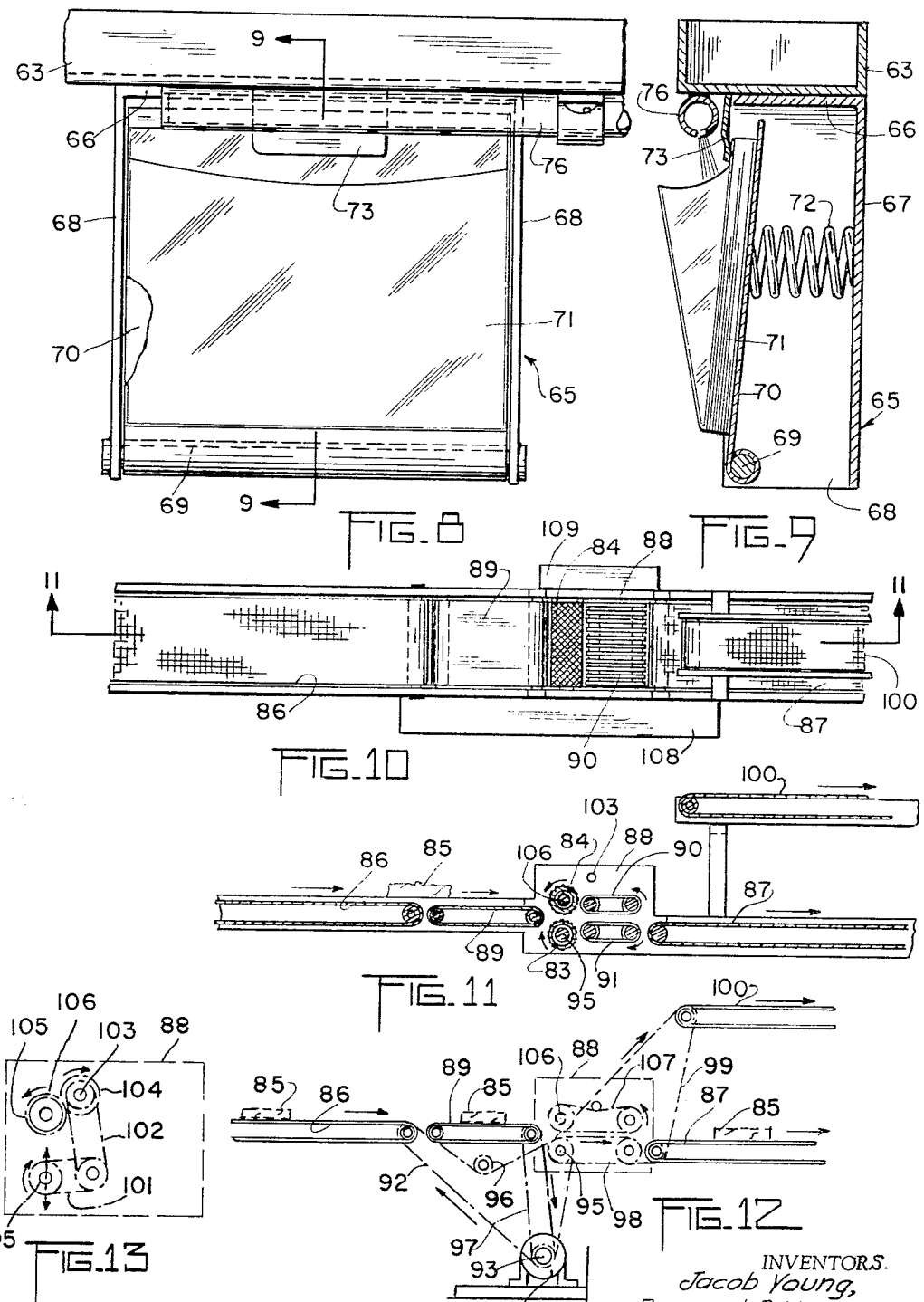

3,282,195
MEAT TENDERIZING MACHINE
Jacob Young, Coral Gables, Raymond D. Mewshaw, Miami, and Harry T. O'Dell, Hialeah, Fla., assignors to Henderson's Portion Pak, Inc., Coral Gables, Fla., a corporation of Florida
Filed Feb. 12, 1964, Ser. No. 344,288
5 Claims. (Cl. 99—254)

The present invention, while relating in general to the art of processing and packaging food products, has more particular reference to the tenderizing and packaging of meat, the problem to be solved and main object of the invention being how to immerse pre-portioned meat, such as steaks, in a tenderizing solution so that there will be enough tenderizer on the meat but not so much as to exceed the percentage allowable under Department of Agriculture regulations or so much as to make the meat mushy or too soft in consistency. At present Department of Agriculture regulations require 3% by weight of tenderizer.

Another object of the invention is the acomplishment of the aforesaid objective by automatically conveying the meat through a bath of tenderizing solution, then removing excess solution by subjecting the meat to a regulated blast of air and, when cubing is required, delivering successive portions of meat to a pair of cubing cylinders relatively adjustable as to the space between them so as to obtain the desired depth of cubing and shaping.

Another object of the invention is the provision of a continuously repeating circulating system for the tenderizing solution which includes a supply receptacle, an overflow box, a sump directly under the box and traversed by the meat when in solution, a pump and a riser from the pump discharging into the overflow box, the box having a low side forming a weir over which the solution flows into the sump and the return flow of the solution to the supply source being by gravity.

Another object of the invention is to provide a machine for the purpose set forth adapted for fast, sanitary, economical and efficient quantity production in that pre-portioned frozen meat, some portions cubed and others not cubed, are conveyed along a process line to a common packaging conveyor belt and delivered to stations where by manual operation they are deflected into plastic bags automatically inflated to receive them, the cubed meat portions being on one side of the packaging conveyor and those not cubed on the other side.

To these and other ends as will become apparent from perusal of the following more detailed description, the invention consists of certain parts and combinations of parts to be fully set forth in the specification and particularly defined in the appended claims.

These objectives are achieved by regulating the amount of tenderizer picked up or absorbed by the meat. This regulation is accomplished in several different ways, namely by regulating the amount of air blast, which blows off the excess tenderizer solution, by regulating the time of immersion of the meat in the tenderizer solution by controlling the speed of the conveyor and in the case of cubed meats by regulating the spacing of the cubing rollers to control the depth of the cubing. Any one or all three of these methods can be used in accordance with this invention to economically and efficiently produce pre-packaged meats.

The accompanying drawings forming a part of the specification are as follows, it being understood that the drawings are for the purpose of illustration only and that such changes in construction and operation of the machine may be made which do not depart from the spirit and scope of the invention as hereinafter described and claimed.

FIGURES 1 and 2 are schematic layouts of the machine in top plan and side elevation, respectively.

FIGURE 3 is a detail, as will be explained, of an air duct and control valve therein.

FIGURE 4 is an enlarged longitudinal sectional detail taken vertically on line 4—4 of FIGURE 1.

FIGURE 5 is a transverse sectional view on the line 5—5 of FIGURE 2.

FIGURE 6 is a side view, as seen in but enlarged with respect to FIGURE 2 of the mounting for the cubing cylinders together with fragmentary portions of conveyors adjacent thereto.

FIGURE 7 is a schematic illustration of the driving means for the cubing cylinders.

FIGURE 8 is an enlarged plan view of one of the plastic bag holders and the associated portion of the bag opening means.

FIGURE 9 is a sectional view on line 9—9 of FIGURE 8.

FIGURE 10 is a plan view similar to FIGURE 1 but illustrating a modification of the invention in the arrangement of the cubing cylinders and associated conveyors.

FIGURE 11 is a sectional view on line 11—11 of FIGURE 10.

FIGURE 12 is a schematic illustration of driving connections on one side of the machine of the rotary elements seen in FIGURES 10 and 11.

And, FIGURE 13 is a schematic showing of additional driving means to those seen in FIGURE 11 but located on the opposing side of the machine and at a larger scale.

In the drawings like reference numerals refer to similar parts throughout the several views.

On each side of the machine at its loading end, seen to the left in FIGURE 1 there is indicated in broken outline a meat block 14 at which a butcher by band saw and/or knives cuts and trims steaks and other meat portions to be tenderized. These blocks 14 and implements employed in the pre-portioning of meat form no part of the instant invention and are referred to merely to emphasize the importance of the machine as a valuable utility in the quantity processing and packaging of meat in the manner set forth.

When reference is hereinafter made to pre-portioned meat passing through the machine as steaks, it is understod that the term implies any of various cuts of meat that can be tenderized, cubed, shaped, and individually packaged.

Steaks to be tenderized only prior to packaging are placed on an open horizontally disposed wire mesh conveyor belt 15 and indicated by numeral 16. And, steaks 17 to be tenderized, cubed, and shaped are placed on like conveyor 18 parallel to but at a higher level than the conveyor 15 and preferably inclined in its direction of travel as indicated by the arrows. The two conveyors 15 and 18, respectively, travel in channel members 19 and 20, the channel 19 at substantially midway of its length being formed with a sump 21 and the channel 20 with a sump 22.

Spanning and, in this instance, supported upon channel member 20 at a point above the sump 22 is an open top overflow box 23 and, similarly spanning and supported upon the channel member 19 is a like overflow box 24, these boxes 23 and 24 the sumps 22 and 21 functioning in the manner now to be described of the meat tenderizing process.

From a pump 25, shown diagrammatically in FIGURE 1, a tenderizing solution 26 is forced through riser 27 which from its nozzle end 28 discharges into box 23. A low side of this box 23 provides a weir 29 over which the solution 26 flows into the sump 20. A baffle plate 30 placed in the box 23 between the weir 29 and nozzle 28 acts to minimize foaming of the solution 26, due to aeration, and prevent foam from passing over the weir 29. Solution 26 from the sump 22 flows through a restricted opening 31 into a box 24 which, like the box 23, is also provided with a baffle 30a and a low side wall forming a weir 29a over which the solution 26 flows into sump 21, this sump 21 in turn discharging through a restricted opening 32 into a pipe 33 through which the solution is returned to the inlet of the pump 25. The sump 21 is shown as having a cleanout opening 34 and drain 35. From the foregoing it will be observed that circulation of the tenderizing solution 26 is continuous and that its return flow from the top overflow box 23 to sump 20, to overflow box 24, and thence to sump 21 is by gravity. The sump 21 is of the required capacity to also function as the chamber supplying solution 26 to the pump 25.

In the tenderizing process that portion of the wire conveyor 18 traversing sump 22, see FIGURE 4, is depressed into the sump by suitable guiding means as ribs 36 on the side walls of channel member 20. And, by this action steaks 17 are thoroughly covered by solution flowing over the weir 29 and by their immersion in solution 26 within the sump. Then, as these steaks 17 successively emerge from sump 22 they are subjected to a blast of air in jets projected from an apertured pipe 37 in rear of the box 23 and supported in fixed position upon and transversely of the channel member 20. Air to the pipe 37 is supplied from a blower 38 through ducts 39 and 40 and its pressure may be controlled by means of a damper 41 in the duct 39. In this manner excess solution on the meat emerging from the sump is blown off into the channel 20 from which it drains back into the sump.

In like manner steaks 16 on the lower level conveyor 15 are treated as they pass through sump 21 and emerge from solution 26 therein to receive an air blast from the blower 38 through an apertured pipe 37a supported upon channel member 19 in rear of overflow box 24 and connected to blower through pipe 40a. Receptacles 42 and 43 at the loading ends of conveyors 15 and 18 receive drainage refuse from the channels 19 and 20 respectively, and in turn are drained off in any preferred manner not shown.

Common to both feed conveyors 15 and 18 adjacent their discharge ends is the receiving end of packaging conveyor 44 also of open wire mesh and mounted to travel in a channel member 45. Steaks 16 tenderized but not cubed are fed from conveyor 15 onto one side of this conveyor 44 while steaks 17 leaving the upper conveyor 18 drop between a pair of knurled cubing cylinders 46 and 47 supported in a fixed frame part 48 between the discharge ends of feed conveyors 15 and 18 with their axes in a horizontal plane. These cylinders 46 and 47 are relatively adjustable as to the space between them, see FIGURE 6, so that the depth of cubing is variable, by the shaft 49 of cylinder 47 being eccentrically mounted, the eccentric 50 being angularly adjustable by the throw of a lever 51 which, at its free end, has connection with the eccentric and an actuating rod 52 mounted for axial movement. A like rod 53 carrying means as an eccentric contacting pin or shoe, not shown, is provided for sustaining thrust against the eccentric.

With reference to FIGURE 2 it will be observed that the left hand end of channel member 20 is fulcrummed on a pair of frame uprights 54 and that its free end is supported upon a bar 55 carried by axially adjustable rods 55a, one rod only being shown, extending vertically from the sides of channel member 19. This permits a varied adjustment of the height between the cubing cylinders and the discharge end of feed conveyor 18 so as to make certain that steaks 17 flopping off the end of the conveyor will drop edgewise between the cylinders 46 and 47. Also, to insure that extra large steaks will fall properly between the cubing cylinders a striker plate 55b is supported for back and forth adjustment on the frame part 48 to deflect these steaks from their normal path of travel. From the cubing cylinders steaks 17 drop onto the opposite side of the common delivery or packaging conveyor 44 from that carrying the steaks 16 received from feed conveyor 15.

Feed conveyors 15 and 18 and packaging conveyor 44 are driven by sprocket and sprocket chain from motor 56. This method of gearing is common practice in machines employing belt conveyors, and for that reason these driving elements are shown schematically and indicated generally by numeral 56a.

The means employed for driving and cubing cylinders 46 and 47, see FIGURES 6 and 7, is as follows:

Shaft 49 of adjustable cubing cylinder or roller 47 and shaft 58, also mounted in frame part 48, are driven from the driving roller 59 of conveyor belt 44 through the medium of sprocket and chain connections generally indicated, also schematically, at 60. A spur gear 61 keyed to shaft 58 is the driver for gear 62 on the eccentrically mounted shaft 49 of the cubing cylinder 47.

Channel member, indicated generally at 45, in which the packaging or delivery conveyor belt 44 travels, includes channel side rails 63 in which the rollers carrying the belt are mounted. Regularly spaced along the sides of channel members 45 are a plurality of packaging stations, in this instance three being shown on each side. Extending laterally from the side rails 63 at these packaging stations are holders for plastic bags and indicated, generally, by numeral 65. Each holder 65 is shown as being formed of sheet material and includes an end wall 66 attached by suitable means, not shown, to a side rail 63, a bottom wall 67 and parallel side walls 68 at right angles to the bottom wall. Extending between the side walls 68 at their free, outer edges is a rod 69 on which is fulcrummed the forward edge of a cover comprising a platen 70 upon which a stack of folded plastic bags 71 is supported in a manner permitting removal of the bags one at a time from the top of the stack. A coiled spring 72 interposed between the bottom wall 67 of the bag holder and the platen 70 yieldingly holds the stack of bags against a clamping member 73 extending forward from the end wall 66.

As clearly shown in FIGURES 8 and 9, the bags 71 are cut back at the open end thus enabling the uppermost bag of a stack to be yieldingly held in place by clamp 73 while being inflated. An air line 74 from a compressor 75 is provided with a plurality of laterals 76, one for each holder 65. These laterals or branch pipes 76 are perforated and lie transversely of their respective holders 65 adjacent the open end of the bags, the top bag of each stack being inflated by a jet or jets of compressed air from its respective pipe 76. As each cubed steak 17 on one side of the conveyor 44 arrives opposite a loading station it is manually deflected by an operator at that station from its direction of travel into an already inflated bag 71. The bag is then released from the clamp 73, the open end of the bag folded back and the thus bagged steak placed in a shipping carton, a carton holding tray 77 being provided adjacent each bag holder 65. Steaks 16 which are not cubed are similarly bagged from the opposite side of the conveyor 44.

A rack for supporting a supply of cartons is provided at each loading station and comprises a pair of L-shaped arms 78 depending from the side rails 63 of the member 45. Upstanding from these rails 63 are the legs of inverted U-shaped members 79 which support the frame 80 in which a conveyor belt 81 is mounted and from which a drip pan 82 is hung, the conveyor 81 and pan 82 being for storage and handling of finished material. The conveyor 81 may be automatically driven or not as desired.

Although much of this invention has been illustrated schematically it is to be noted that all sprockets, chains and gears are provided with safety shields.

FIGURES 10 to 13, inclusive, show a modification of the invention in which cubing cylinders, indicated at 83 and 84, lie one above the other in a vertical plane, this arrangement being to permit passage of pre-portioned meat shown at 85 to pass from a feed conveyor 86 to a packaging conveyor 87 without change of direction. The process line shown is for cubed steaks only. It is understood that the steaks on the conveyor 86 have received tenderizing treatment by the same manner and means as in machine hereinabove described and that packaging stations are provided along the conveyor 87. The cubing cylinders 83 and 84 are relatively adjustable as to the space between them, 83 being the adjustable and 84 the fixed cylinder, and they are mounted in a frame part 88.

For the more satisfactory delivery of steaks 85 to and from the cubing cylinders 83 and 84, the yare fed from the conveyor 86, which is of open wire mesh, onto a comparatively short flat surfaced conveyor belt 89 which in turn delivers them to the cubing cylinders. And, instead of passing directly from such cylinders to the packaging conveyor 87, the now cubed steaks first engage between a pair of shorts belts 90 and 91 which feed them to the conveyor 87. These feed belts 90 and 91 are preferably formed of slightly spaced parallel plastic cord or strips engaging grooved rollers.

Sprocket and sprocket chain driving connections on one side of the machine are schematically shown in FIGURE 12 and in which a sprocket chain 92 from shaft 93 of motor 94 drives feed conveyor 86, shaft 95 of cubing cylinder 83 and also engages an idle sprocket 96. A second sprocket chain 97 from motor shaft 93 drives the short conveyor 89 in advance of the cubing cylinders. A third sprocket chain 98 drives the lower belt 91 of the pair of short feed belts and, a fourth sprocket chain 99, from cylinder shaft 95 is shown as driving the storage conveyor 100 functioning for a like purpose as conveyor 81.

The driving means on the other side of the machine, as seen in FIGURE 13, is similar to that shown in FIGURE 7 but rotated 90°. It includes a sprocket chain 101 driven from cylinder shaft 95 and which in turn through chain 102 drives a shaft 103 mounted in the frame part 88. This shaft 103 carries a gear 104 which meshes with a like gear 105 on shaft 106 of the fixed cylinder 84 and a sprocket chain 107 driven by the shaft 106 drives the upper belt 90 of the pair of short feed conveyors. The housing indicated at 108 and 109 in FIGURE 10 are for the gearing illustrated in FIGURES 12 and 13, respectively.

It is believed that from the foregoing the construction and operation of the pre-portioned meat tenderizing and packaging apparatus have been made clear to those skilled in the art and my invention is to be limited only by the following claims.

What we claim is:

1. In meat tenderizing apparatus wherein the meat to be tenderized is a sucession of pre-portioned cuts, a receptacle for a tenderizing solution, a first meat conveyor trasversing said receptacle in a manner to immerse the meat in said solution, said conveyor including an endless belt of open wire mesh and conveyor driving means, means for blowing excess solution from the meat as it emerges from the solution in said receptacle, said blowing means including an air blower and an air pipe arranged transversely of said first conveyor for projecting air jets against meat passing under said pipe, means permitting the solution blown from the meat to flow back into said receptacle, a pair of cubing cylinders positioned to receive meat cuts from said first conveyor after removal of excess solution therefrom, and a second conveyor onto which the cubed meat cuts are delivered by said cylinders.

2. Meat tenderizing apparatus according to claim 1 wherein the amount of tenderizer remaining on the meat is controlled by regulating the time that the meat remains in said tenderizing solution by controlling the speed of said conveyor driving means by regulating the speed of said air blower, and by regulating the spacing and pressure of said cubing cylinders.

3. In apparatus for tenderizing pre-portioned meat, means for continuously recirculating a tenderizing solution comprising a pump, a riser from said pump, a first overflow box into which said riser discharges, a first receptacle for receiving the overflow from said first box, a second overflow box into which said first receptacle discharges, each of said boxes having a low side wall providing a weir over which said solution flows and a suds retaining baffle, a second receptacle for receiving the overflow from said second box, a pipe connection from said second receptacle to said pump, the return flow of the solution from said first box to said second receptacle being by gravity, a first open wire mesh meat conveyor traversing said first receptacle in such a manner that meat conveyed thereon is bathed by solution in and falling into said first receptacle, a second open wire mesh conveyor traversing said second receptacle in such a manner that meat conveyed thereon is bathed by solution in and falling into said second receptacle, driving means for said conveyors, means for blowing excess solution from the meat emerging from the solution in said receptacles, a pair of cubing cylinders in the processing line of said first conveyor, and a third conveyor onto which the meat from both said second conveyor and said cubing cylinders is delivered.

4. The combination according to claim 3 but including channel members in which the said conveyors are mounted to travel and characterized by said receptacles being sumps in said respective channel members and a means permitting the excess tenderizer blown from the meat to flow into said sumps.

5. The combination according to claim 3 characterized by said cubing cylinders being relatively adjustable as to the space between them and including means ensuring the edgewise passage of meat portions varying in size between the cylinders.

References Cited by the Examiner

UNITED STATES PATENTS

| | | | |
|---|---|---|---|
| 735,890 | 8/1903 | Magniez | 118—24 X |
| 824,202 | 6/1906 | Peters | 118—24 X |
| 1,140,873 | 5/1915 | Carter | 118—63 X |
| 1,218,241 | 3/1917 | Crumbaugh | 118—63 |
| 1,561,503 | 11/1925 | Barry et al. | 99—254 |
| 1,611,576 | 12/1926 | Bausman | 118—24 X |
| 1,659,243 | 2/1928 | Coon | 118—63 |
| 1,760,979 | 6/1930 | Ferry | 99—443 |
| 1,964,090 | 6/1934 | Spang | 17—26 |
| 2,198,209 | 4/1940 | Musher | 99—157 X |
| 2,241,650 | 5/1941 | Spang | 17—26 X |
| 2,274,284 | 2/1942 | Vore | 118—304 X |
| 2,525,306 | 10/1950 | Lunsford | 118—304 X |
| 2,629,311 | 2/1953 | Graves | 99—255 |
| 2,902,369 | 9/1959 | Komarik | 99—159 |
| 2,903,366 | 9/1959 | Barnett | 99—159 |
| 2,907,160 | 10/1959 | Friedman et al. | 53—189 |
| 2,918,771 | 12/1959 | Wickliff | 53—189 |
| 2,993,470 | 7/1961 | Stickel | 118—419 X |
| 3,016,004 | 1/1962 | Harper et al. | 99—255 |
| 3,084,730 | 4/1963 | Stahmer | 17—26 X |
| 3,149,554 | 9/1964 | Greenspan | 99—254 |

FOREIGN PATENTS 480,456  2/1938  Great Britain.

WALTER A. SCHEEL, *Primary Examiner.*

H. LORD, IRVING BUNEVICH, *Examiners.*

C. I. COUGHENOUR, *Assistant Examiner.*